United States Patent [19]

Schwarzli

[11] 4,429,806

[45] Feb. 7, 1984

[54] ROTATING DRUM DISPENSING MACHINE

[75] Inventor: Joseph W. Schwarzli, Stouffville, Canada

[73] Assignee: Twin-Cee Limited, Georgetown, Canada

[21] Appl. No.: 298,478

[22] Filed: Sep. 1, 1981

[51] Int. Cl.³ .............................................. B65H 7/18
[52] U.S. Cl. ....................................... 221/20; 221/227
[58] Field of Search ...................... 221/20, 17, 18, 277, 221/279, 231, 226, 227, 266, 263, 151

[56] References Cited

U.S. PATENT DOCUMENTS

| | | | |
|---|---|---|---|
| 716,507 | 12/1902 | Williams | 221/20 |
| 1,739,982 | 12/1929 | Morin | 221/20 |
| 2,078,490 | 4/1937 | Fritsche et al. | 221/20 |
| 2,106,469 | 1/1938 | Seil | 221/236 |
| 2,902,196 | 9/1959 | Gray | 221/279 |
| 3,073,314 | 1/1963 | Machingo et al. | 221/227 |

Primary Examiner—Joseph J. Rolla
Assistant Examiner—Kenneth Noland

[57] ABSTRACT

The present invention provides a dispensing device comprising a rotatable operating member moveable from an initiate position to a dispensing position to operate a rotating dispenser within the device. The device is provided with a chute for loading the articles in the device and for feeding the articles to the dispenser. A locking member is provided which moves along the chute as the articles are fed to the dispenser. The locking member is adapted to move to a locking position for engaging the dispenser and for preventing its rotation when the chute has been emptied with the arrangement being such that the operating member is held away from the intiate position when the locking member moves to the locking position to indicate that the chute requires further loading.

2 Claims, 13 Drawing Figures

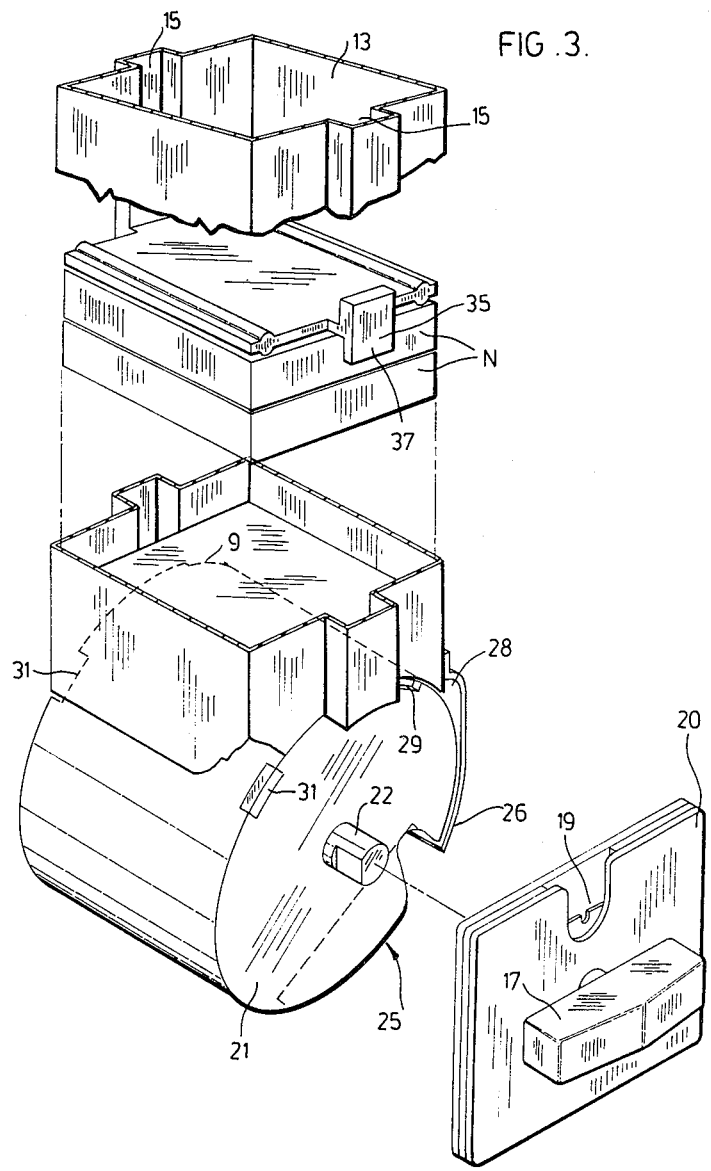

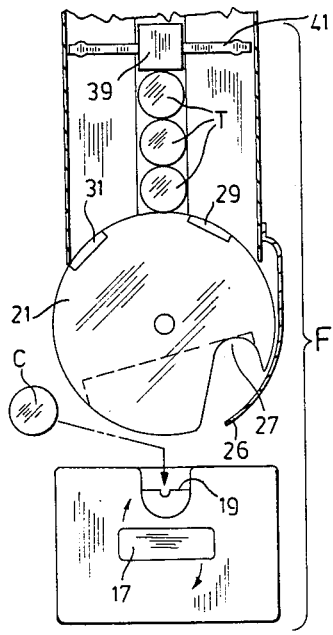
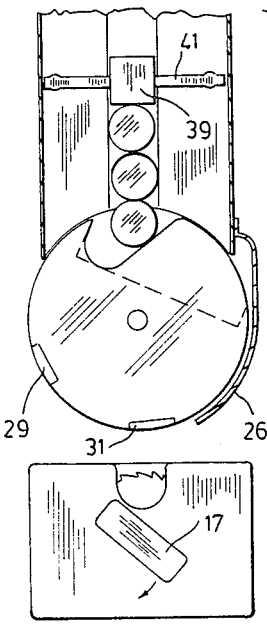
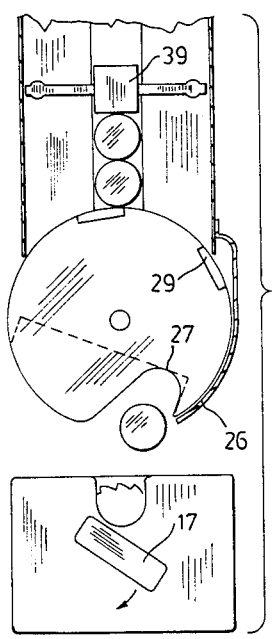
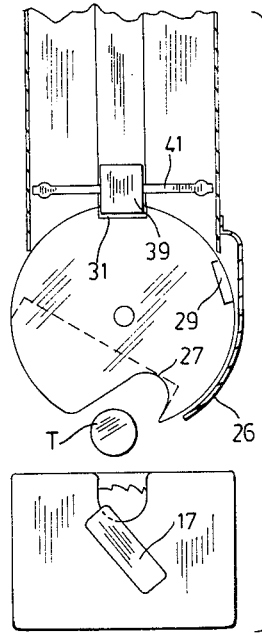

ROTATING DRUM DISPENSING MACHINE

FIELD OF THE INVENTION

The present invention relates to a dispensing device in which a loading chute is adapted to feed articles to a rotating dispensing mechanism which through its rotation takes the articles from the loading chute to an opening through which the articles are dispensed.

BACKGROUND OF THE INVENTION

There are presently available many different types of dispensing machines most of which have complicated internal mechanisms to provide for the dispensing of articles from the machines. These complicated mechanisms are often subject to premature breakdowns resulting in inefficient operation and frequent maintenance to the machines.

According to most applications these dispensing machines are coin operated and coin operated vending machines have two further common drawbacks in addition to those described above. Firstly, many of the coin operated vending machines will accept coins even when the machines are empty so that the coin is lost without any articles being dispensed from the machine to the user. Secondly, some coin operated vending machines are subject to constant pilfering because the article loading region is reachable through the dispensing opening without requiring the insertion of a coin into the machines.

SUMMARY OF THE PRESENT INVENTION

The present invention provides a dispensing device comprising a rotatable operating member moveable from an initiate position through an operate position to operate dispensing means which rotates for dispensing articles from the dispensing device, a chute for loading the articles in the device and for feeding the articles to the dispensing means and a locking member which moves along the chute as the articles are fed to the dispensing means. The locking member is adapted to move to a locking position for engaging the dispensing means and for preventing its rotation when the chute has been emptied. The operating member is held away from the initiate position when the locking member moves to the locking position to indicate that the chute requires further loading.

The system is extremely simple with very few moving components which substantially reduces the likelihood of any breakdowns within the device. In fact, the device is preferably set up such that the feed to and from the dispensing means is strictly gravity operated, further decreasing the likelihood of malfunctions.

According to an aspect of the invention the dispensing device is set up for coin operation. According to this aspect a coin opening is provided on and carried with the rotatable operating member. The coin opening is positioned on the operating member such that it is accessible to an appropriate coin when the operating member is in the initiate position. When the operating member is held away from the initiate position by the locking member the coin opening is inaccessible to the same appropriate coin so that the coin cannot be lost in the machine after it has been emptied.

The device may used to dispense a plurality of different types of goods. By way of example, the device is used for the vending of both boxed sanitary napkins and individual tampons with the chute and the dispensing means being arranged to accommodate either of these two items.

BRIEF DESCRIPTION OF THE DRAWINGS

The above as well as other advantages and features of the present invention will be described in greater detail according to the preferred embodiments of the present invention wherein:

FIG. 3 shows in perspective a partially exploded view of the dispensing arrangement of FIG. 1 when used to dispense a boxed article;

DETAILED DESCRIPTION ACCORDING TO THE PREFERRED EMBODIMENTS OF THE PRESENT INVENTION

Figure 1:
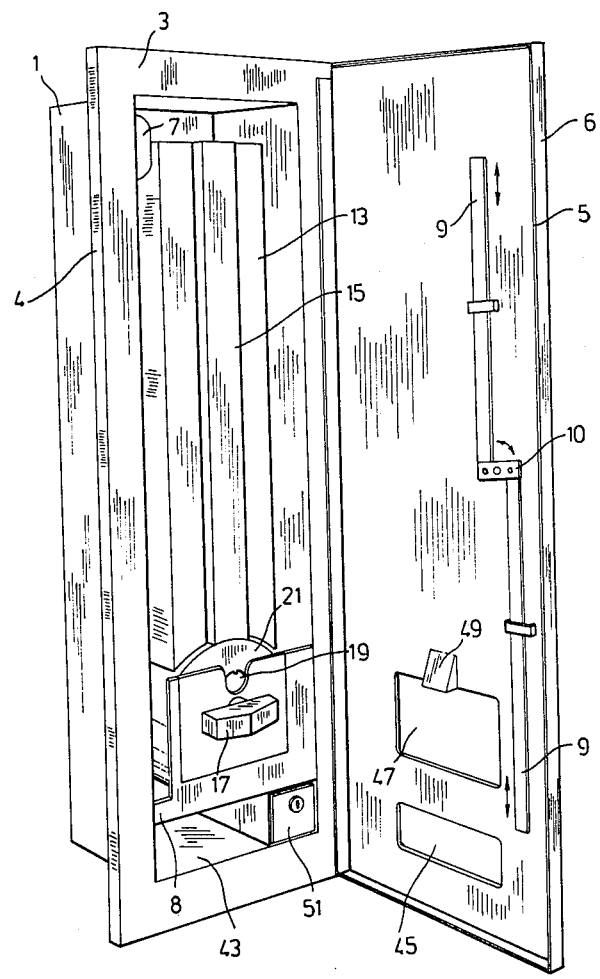
FIG. 1 is a front perspective view showing a coin operated dispensing machine according to a preferred embodiment of the present invention.

The preferred embodiment structure shown in FIG. 1 comprises a housing formed from a rearward box portion 1 and a forward door 5 adapted to close the box portion. The internal dispensing mechanism of the device is located within the housing.

The housing further includes a flange region 3 at the open face of box 1 and a skirt 4 on the flange region. Door 5 is provided with a skirt 6 adapted to overlie skirt 4 when the door is closed to essentially eliminate unauthorized access to the internal dispensing mechanism. The box is further provided with catches 7 and 8 adapted to receive locking bars 9 controlled by swivel handle 10 on the door for locking the unit closed.

Provided interiorly of the housing is a vertically extending storage chute 13 with a rotating drum 21 provided immediately beneath the chute. A handle 17 is journalled to the drum and extends through opening 47 provided in door 5 when the door is closed. A coin insert having a coin receiving portion 19 is provided immediately above handle 17 such that the coin insert is also exposed through door opening 47. A coin guide 49 is provided on the door to facilitate the insertion of coins at the coin insert when the door is closed.

A dispensing chamber 43 is provided within the housing immediately beneath rotatable drum 21. When the door is closed chamber 43 is exposed through door opening 45 which aligns with the chamber. A coin receiving box 51 is provided immediately beside chamber 43 within the housing.

Figure 2:
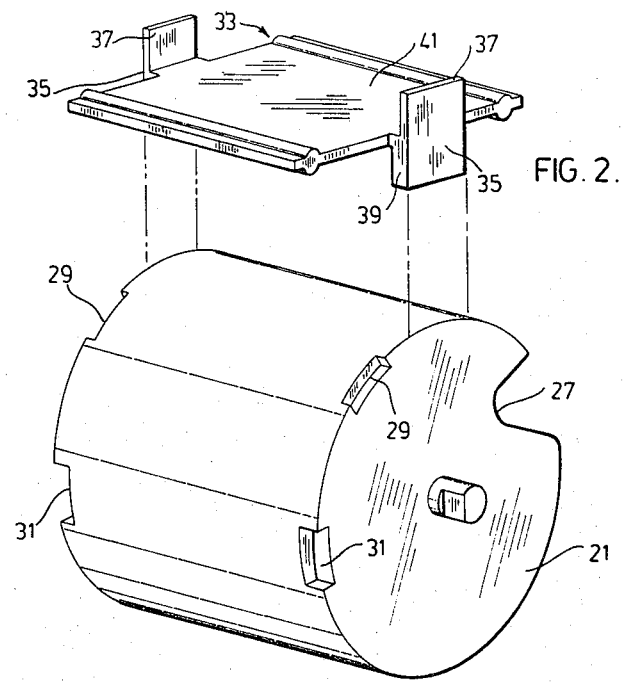
FIG. 2 shows in perspective a rotating drum dispenser and a locking member adapted to lock the drum when the dispenser has been emptied.
Figure 8:
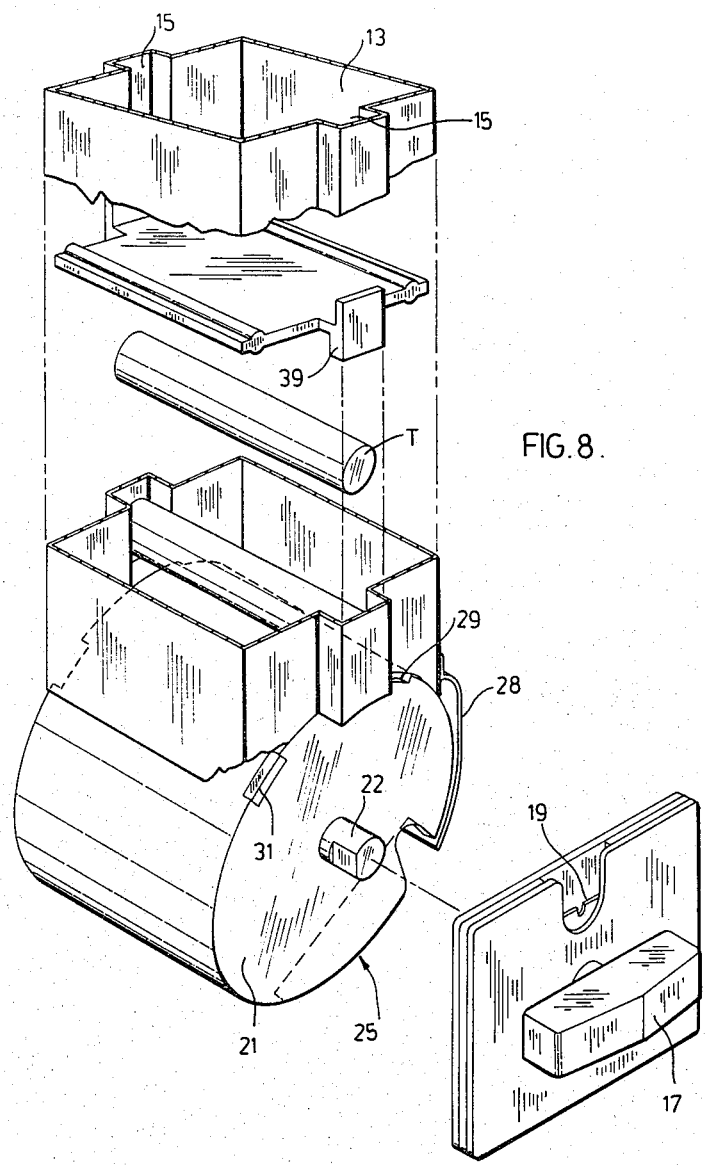
FIG. 8 is a view similar to FIG. 3 except that it shows the device when used to dispense individual tampons; and, FIGS. 9 through 12 are side views showing in sequence coin operating of the device of FIG. 8 during the dispensing of the tampons.

Chute 13 although generally rectangular is provided with a pair of opposed channel regions 15 which are best seen in FIGS. 3 and 8. A locking member 33 also shown in FIGS. 3 and 8, but best shown in FIG. 2 is adapted to slide downwardly within chute 13 guided by channel regions 15. This locking member which has a main body portion 41 is provided at its outer ends with a pair of lug portions 35. Each of these lug portions has opposed thin regions 37 facing upwardly in FIG. 2 as well as opposed thicker regions 39 facing downwardly in FIG. 2.

Figure 2A:
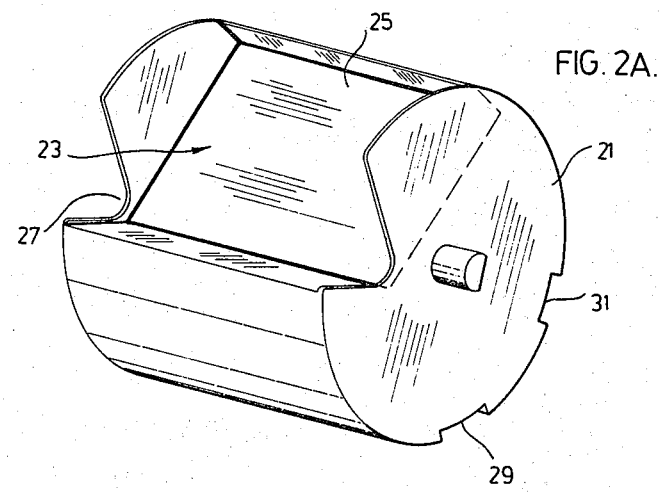
FIG. 2a shows the same dispenser as shown in FIG. 2 rotated to a different position from that shown in the earlier figure.

Referring to FIG. 2a, rotating drum 21 is provided with an article receiving recess generally indicated at 23 and including a box receiving region 25 as well as a roll receiving region 27. Provided at the periphery of the rotating drum, away from the article receiving recess are a first pair of opposed slots 29 as well as a second pair of opposed slots 31. As can be seen in FIG. 2 slots 31 are slightly wider than slots 29 to cooperate with locking member 33 as described below.

Referring again to FIGS. 3 and 8, drum 21 is provided with a stem 22 connected directly through a supporting plate 20 to the rotating handle 17. Therefore, when handle 17 is rotated drum 21 rotates with the handle.

Handle 17 is locked against rotation until an appropriate coin is inserted into the coin slot 19 which releases a standard coin lock mechanism not shown in the drawings. The releasing of the coin lock mechanism allows rotating of handle 17.

In order to insert an appropriate coin into the coin insert 19, handle 17 must be in the zero or initiate position shown in FIGS. 3 and 8 because the coin insert rotates with handle 17 and once the handle is rotated away from the initiate position the coin insert is no longer accessible to the appropriate coin.

When there are articles stored in chute 13 handle 17 assumes the zero or initiate position through the coin lock mechanism which is spring loaded to move the handle to the zero position. This allows insertion of an appropriate coin into the dispenser without fear of the dispenser being empty. Furthermore, one very important feature of the present invention is that drum 21 in all positions of rotation completely blocks the lower end of chute 13 from the dispensing cavity 43 and door opening 45. This feature in combination with the tamper resistent construction of the housing makes the unit essentially pilfer-proof.

FIGS. 4 through 7 show the unit when used for the dispensing of the boxed napkins as indicated at N. These boxes are stored in chute 13 supported from beneath by drum 21 with locking member 33 sitting atop the upper most box in the chute. The locking member is positioned such that body portion 41 is supported by the boxes with lugs 35 fitted in the channels 15 to either side of the chute. The locking member is positioned such that the thinner lug portions 37 are turned downwardly for the dispensing of the napkins.

Figure 4:
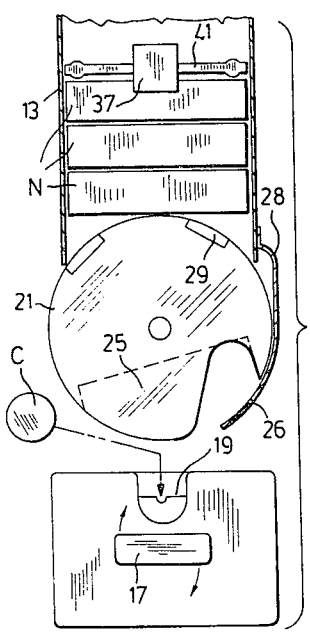
FIGS. 4 through 7 are side views of the arrangement shown in FIG. 3 showing in sequence the coin operating of the device for the dispensing of the boxed articles.
Figure 5:
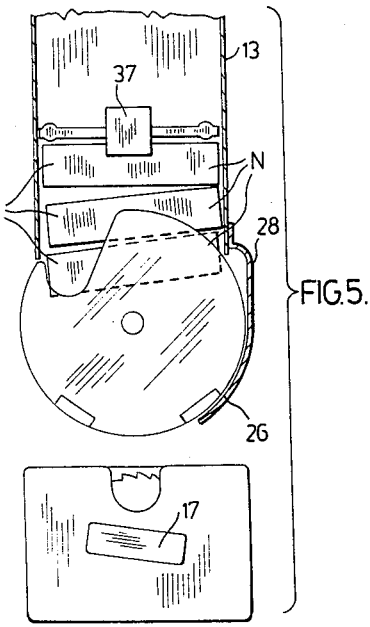
Figure 6:
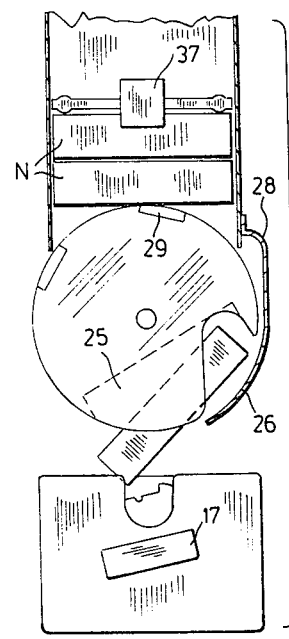

In FIG. 4 coin C is inserted into coin insert 19 allowing handle 17 to be rotated away from the initiate position. At about 180 degrees rotation as shown in FIG. 5 box receiving recess 25 is turned upwardly beneath the lower end of the chute such that the lower most napkin box falls into the box receiving region of the article recess. At the same time the remaining boxes move down a position with locking member 33 dropping down with the boxes. The lower end of the chute is covered by a shroud 26 which is bowed outwardly at 28 to allow the box in the drum to rotate away from the chute for continued rotation of handle 17 beyond the FIG. 5 position with the napkin box being carried with the drum to the FIG. 6 position where the napkins fall from the box receiving region down into cavity 43. As will be seen in FIG. 6 drum 21 continues to rotate when there are further napkins in the chute so that handle 17 can be rotated slightly beyond the FIG. 6 position back to the zero position of FIG. 4.

Figure 7:
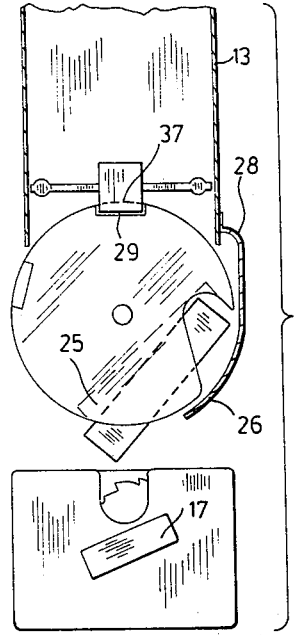

However, once the final napkin box has been dispensed as shown in FIG. 7, there is nothing to block the locking member away from the drum and therefore lug portions 37 of locking member 33 drop down into the peripheral slots 29 on drum 21. This locks the rotating drum and holds handle 17 and coin insert 19 away from the zero position making the coin insert totally inaccessible to the insertion of further coins into the unit. As will be seen in FIG. 7 the locking of the drum does not occur until the drum has been rotated such that the last napkin box has cleared beyond shroud portion 26 allowing the box to drop down into the dispensing cavity.

When the unit is used to dispense tampons as shown in FIGS. 9 through 12 the tampons which are slightly wider than the napkin boxes, are fitted directly into channels 15 of chute 13. Furthermore locking member 33 is reversed such that the wider lug portions 39 of the locking member are turned downwardly. These lug portions seat directly atop the tampons which are again supported from beneath by drum 21.

The dispensing of the tampons T is generally the same as the dispensing of the napkins described above with the exception that the actual movement of the tampons to cavity 43 is slightly retarded relative to the napkin dispensing and as such the locking of drum 21 during the dispensing of the last tampon must also be slightly retarded.

More specifically, when the tampons are loaded in the chute as described above, and with handle 17 in the FIG. 9 coin receiving position, coin insert 19 is accessible to an appropriate coin. After the coin is inserted the handle can be released to rotate drum 21 such that the article receiving recess is exposed to the stacked tampons. The lowermost tampon rides over the relatively narrow box receiving region to the cut away roll receiving region 27 where the tampon drops down into a dispensing position. It will be noted that the dispensing position for the tampon is rearward of the dispensing position for the napkins producing the retarded dispensing mentioned above. Continued rotation of the drum to the FIG. 11 position results in the tampon dropping from the drum into the dispensing cavity. The handle is then released and the spring in the coin lock mechanism automatically returns the handle to the FIG. 9 position as along as there are further tampons in the chute blocking the locking member away from the drum.

During the dispensing of the final tampon from the dispenser chute 13 is emptied as the tampon falls down into the roll receiving recess so that the lug portions 39 of locking member 33 ride on the periphery of the drum. The drum is rotated in order to move the tampon to the dispensing cavity past shroud 26. Premature locking of the lug portions into slots 29 which would otherwise prevent the clearing of the tampon past the shroud is prevented by virtue of the downward positioning of thick lug portions 39 which ride over the thinner peripheral slots. This allows the drum to be rotated far enough to drop the tampon into the dispensing cavity as shown in the FIG. 12 position. At the same time that the tampon is dropped from the drum lug portions 39 align with the wider peripheral slots 31 which are adapted to receive the thicker lug portions and lock the drum in the FIG. 12 position. As will be seen, the coin insert is held away from the coin insert position so that no further coins can be placed in the unit after it has been emptied.

With both the napkins and the tampons the principle of operation is the same i.e. to hold the coin insert away from the coin receiving position when the chute is empty although the positioning of operating handle 17 is slightly different from one application to the other. According to the napkin dispensing arrangement the handle is prevented from rotating a full 360 degrees so that it cannot return to the initiate position whereas according to the tampon dispensing arrangement the handle is rotated beyond 360 degrees and prevented from returning to the 360 degree position by the locking member.

As will be seen from the description above, the dispensing system of the present invention is extremely simple requiring very few moving components making it inexpensive from both a manufacturing as well as a maintenance standpoint. Furthermore, the system when used in a coin operated vending machine is essentially pilfer-proof while at the same time being adapted to assure that coins cannot be lost in the unit when all the articles have been dispensed resulting in customer satisfaction.

Although various preferred embodiments of the invention have been described herein in detail it will be appreciated by those skilled in the art that variations may be made thereto without departing from the spirit of the invention or the scope of the appended claims.

The embodiments of the invention in which an exclusive property or privilege is claimed are defined as follows:

1. A coin operated dispensing device comprising a rotatable operating member provided with a coin insert for receiving a coin to release said operating member, said coin insert being moveable to and away from a coin loading position with rotation of said operating member, a rotatable drum adapted for rotation with said operating member to dispense articles to a dispensing opening in said device, a chute for loading the articles in said device and for feeding the articles to said rotatable drum which is located between said dispensing opening the said chute for blocking said chute against pilfering through said dispensing opening in all positions of rotation of said drum, said chute extending generally vertically in said dispensing device and including a locking member adapted to slide downwardly in said chute as the articles are fed therefrom, said chute being provided with two outer channel regions, one to either side of said chute, said locking member being provided with a pair of lugs adapted to slide downwardly in said channel regions and said drum being provided with a pair of slots for engaging said pair of lugs such that said locking member moves to a locking position for locking both said drum and said operating member against rotation when said chute has been emptied and said coin insert being held away from said coin loading position to prevent insertion of coins in said dispensing device when said chute is empty.

2. A coin operated dispensing device as claimed in claim 1 when used for dispensing both boxed sanitary napkins and individual tampons, said channel regions being adapted to receive the tampons, said locking member comprising a body portion interconnecting said pair of lugs, said drum being provided with a first pair of peripheral slots and a second pair of longitudinal slots circumferentially spaced from said first pair of peripheral slots, each of the lugs on said locking member extending to either side of said body portion and each lug presenting a wide lug portion to one side of said body portion and a narrow lug portion to the other side of said body portion, said locking member being reversible in said chute, said first pair of peripheral slots being adapted to receive the narrow lug portions of said pair of lugs and the wide lug portions of said lugs being adapted to override said first pair of peripheral slots and to lock in said second pair of peripheral slots when said locking member is reversed in said chute to provide locking of the drum during dispensing of both the boxed sanitary napkins and the individual tampons.

* * * * *